(12) United States Patent
Volpano

(10) Patent No.: US 7,986,937 B2
(45) Date of Patent: Jul. 26, 2011

(54) PUBLIC ACCESS POINT

(75) Inventor: Dennis Michael Volpano, Salinas, CA (US)

(73) Assignee: Microsoft Corporation, Redmond, WA (US)

( * ) Notice: Subject to any disclaimer, the term of this patent is extended or adjusted under 35 U.S.C. 154(b) by 845 days.

(21) Appl. No.: 10/754,402

(22) Filed: Jan. 9, 2004

(65) Prior Publication Data

US 2004/0141617 A1 Jul. 22, 2004

Related U.S. Application Data

(63) Continuation-in-part of application No. 10/057,566, filed on Jan. 25, 2002, now Pat. No. 7,188,364.

(51) Int. Cl.
*H04M 1/66* (2006.01)
*H04M 1/00* (2006.01)
*H04B 7/00* (2006.01)
*H04L 12/56* (2006.01)

(52) U.S. Cl. ..... 455/410; 455/411; 455/524; 455/552.1; 370/395.53

(58) Field of Classification Search .................. 380/270; 709/227; 370/465, 338, 445, 395.53, 400; 455/41.2, 41.3, 410, 411, 524, 552.1
See application file for complete search history.

(56) References Cited

U.S. PATENT DOCUMENTS

| | | | |
|---|---|---|---|
| 4,919,545 A | 4/1990 | Yu | |
| 5,550,984 A | 8/1996 | Gelb | |
| 5,619,657 A | 4/1997 | Sudama et al. | |
| 5,764,890 A | 6/1998 | Glasser et al. | |
| 5,790,800 A | 8/1998 | Gauvin et al. | |
| 5,822,431 A | 10/1998 | Sprunk | |
| 5,918,019 A | 6/1999 | Valencia | |
| 5,940,591 A | 8/1999 | Boyle et al. | |
| 5,963,556 A | 10/1999 | Varghese et al. | |
| 5,978,378 A | 11/1999 | Van Seters et al. | |
| 6,003,137 A | 12/1999 | Kawasaki | |
| 6,035,105 A | 3/2000 | McCloghrie et al. | |
| 6,035,405 A | 3/2000 | Gage et al. | |
| 6,041,358 A | 3/2000 | Huang et al. | |
| 6,047,325 A | 4/2000 | Jain et al. | |
| 6,061,796 A | 5/2000 | Chen et al. | |
| 6,070,243 A | 5/2000 | See et al. | |

(Continued)

FOREIGN PATENT DOCUMENTS

EP 0939519 A1 9/1999

(Continued)

OTHER PUBLICATIONS

Kent et al, "Security Architecture for the Internet Protocol", Nov. 1998, Network Working Group Request for Comments, RFC 2401, pp. 1-62.

(Continued)

*Primary Examiner* — Nick Corsaro
*Assistant Examiner* — Shannon R Brooks
(74) *Attorney, Agent, or Firm* — Shook Hardy & Bacon

(57) ABSTRACT

The invention instantiates a Personal VLAN bridge, using IEEE Std. 802.11 elements. The result is a bridge, referred to as a public access point, that is better suited for implementing public wireless data networks than the IEEE Std. 802.11 architecture. The invention also provides a location-update protocol for updating the forwarding tables of bridges that connect public access points together. The invention further provides a method for more controlled bridging, which is referred to as fine bridging.

16 Claims, 4 Drawing Sheets

U.S. PATENT DOCUMENTS

| | | | |
|---|---|---|---|
| 6,085,238 A * | 7/2000 | Yuasa et al. ............... 709/223 |
| 6,157,647 A | 12/2000 | Husak |
| 6,181,699 B1 | 1/2001 | Crinion et al. |
| 6,226,751 B1 | 5/2001 | Arrow et al. |
| 6,237,093 B1 | 5/2001 | Vatanen |
| 6,308,213 B1 | 10/2001 | Valencia |
| 6,311,218 B1 | 10/2001 | Jain et al. |
| 6,339,830 B1 | 1/2002 | See et al. |
| 6,414,956 B1 | 7/2002 | Szcepanek |
| 6,487,598 B1 | 11/2002 | Valencia |
| 6,615,357 B1 | 9/2003 | Boden et al. |
| 6,636,898 B1 | 10/2003 | Ludovici et al. |
| 6,639,901 B1 | 10/2003 | Katzri et al. |
| 6,640,302 B1 | 10/2003 | Subramaniam et al. |
| 6,675,225 B1 | 1/2004 | Genty et al. |
| 6,697,943 B1 | 2/2004 | Frantz |
| 6,701,437 B1 | 3/2004 | Hoke et al. |
| 6,728,249 B2 | 4/2004 | Chang |
| 6,798,751 B1 | 9/2004 | Voit et al. |
| 6,847,620 B1 * | 1/2005 | Meier ............... 370/328 |
| 6,874,090 B2 | 3/2005 | See et al. |
| 6,898,791 B1 | 5/2005 | Chandy et al. |
| 6,912,592 B2 | 6/2005 | Yip |
| 6,917,614 B1 | 7/2005 | Laubach et al. |
| 6,920,502 B2 | 7/2005 | Araujo et al. |
| 6,954,790 B2 | 10/2005 | Forslow |
| 6,961,762 B1 | 11/2005 | Yeap et al. |
| 6,970,459 B1 | 11/2005 | Meier |
| 6,970,941 B1 | 11/2005 | Caronni et al. |
| 6,976,177 B2 | 12/2005 | Ahonen |
| 7,000,121 B2 | 2/2006 | Jarosz |
| 7,028,337 B2 | 4/2006 | Murakawa |
| 7,042,852 B2 | 5/2006 | Hrastar |
| 7,055,171 B1 | 5/2006 | Martin et al. |
| 7,058,796 B2 | 6/2006 | Lynn et al. |
| 7,069,437 B2 | 6/2006 | Williams |
| 7,086,089 B2 | 8/2006 | Hrastar et al. |
| 7,088,714 B2 | 8/2006 | Athreya et al. |
| 7,093,027 B1 | 8/2006 | Shabtay et al. |
| 7,107,464 B2 | 9/2006 | Shapira et al. |
| 7,120,791 B2 | 10/2006 | Volpano |
| 7,130,904 B2 * | 10/2006 | Kitchin ............... 709/225 |
| 7,151,762 B1 * | 12/2006 | Ho et al. ............... 370/338 |
| 7,164,912 B2 | 1/2007 | Buckley et al. |
| 7,174,390 B2 | 2/2007 | Schulter et al. |
| 7,181,542 B2 | 2/2007 | Tuomenoksa et al. |
| 7,188,180 B2 | 3/2007 | Larson et al. |
| 7,188,364 B2 | 3/2007 | Volpano |
| 7,194,622 B1 * | 3/2007 | Halasz et al. ............... 713/163 |
| 7,203,957 B2 | 4/2007 | Balissat et al. |
| 7,209,479 B2 | 4/2007 | Larson |
| 7,313,135 B2 | 12/2007 | Wyatt |
| 7,401,354 B2 | 7/2008 | Boden et al. |
| 7,434,047 B2 | 10/2008 | Sharma |
| 7,478,427 B2 | 1/2009 | Mukherjee et al. |
| 2001/0020273 A1 | 9/2001 | Murakawa |
| 2001/0047484 A1 | 11/2001 | Medvinsky et al. |
| 2001/0048744 A1 * | 12/2001 | Kimura ............... 380/247 |
| 2001/0054158 A1 | 12/2001 | Jarosz |
| 2002/0009078 A1 | 1/2002 | Wilson et al. |
| 2002/0016926 A1 | 2/2002 | Nguyen et al. |
| 2002/0027906 A1 | 3/2002 | Athreya et al. |
| 2002/0032725 A1 | 3/2002 | Araujo et al. |
| 2002/0069278 A1 | 6/2002 | Forslow |
| 2002/0071448 A1 * | 6/2002 | Cervello et al. ............... 370/445 |
| 2002/0083344 A1 | 6/2002 | Vairavan |
| 2002/0091795 A1 | 7/2002 | Yip |
| 2002/0093915 A1 | 7/2002 | Larson |
| 2002/0143960 A1 | 10/2002 | Goren et al. |
| 2002/0163920 A1 | 11/2002 | Walker et al. |
| 2002/0174335 A1 | 11/2002 | Zhang et al. |
| 2002/0178240 A1 | 11/2002 | Fiveash et al. |
| 2002/0178361 A1 | 11/2002 | Genty et al. |
| 2002/0199021 A1 | 12/2002 | Beier |
| 2003/0037125 A1 | 2/2003 | Luman et al. |
| 2003/0037169 A1 | 2/2003 | Kitchin |
| 2003/0037258 A1 | 2/2003 | Koren |
| 2003/0112820 A1 * | 6/2003 | Beach ............... 370/465 |
| 2003/0120763 A1 | 6/2003 | Volpano |
| 2003/0227893 A1 | 12/2003 | Bajic |
| 2004/0054902 A1 | 3/2004 | Fujimoto et al. |
| 2004/0083295 A1 | 4/2004 | Amara et al. |
| 2004/0093431 A1 | 5/2004 | Genty et al. |
| 2004/0107285 A1 | 6/2004 | Larson et al. |
| 2004/0111520 A1 | 6/2004 | Krantz et al. |
| 2004/0117653 A1 | 6/2004 | Shapira et al. |
| 2004/0255164 A1 | 12/2004 | Wesemann |
| 2005/0055306 A1 | 3/2005 | Miller et al. |
| 2005/0210237 A1 | 9/2005 | Balaz et al. |
| 2005/0223111 A1 | 10/2005 | Bhandaru et al. |
| 2005/0226257 A1 | 10/2005 | Mirzabegian et al. |
| 2005/0283604 A1 | 12/2005 | Deshpande et al. |
| 2006/0070115 A1 | 3/2006 | Yamada et al. |
| 2006/0077926 A1 | 4/2006 | Rune |
| 2006/0077977 A1 | 4/2006 | Caronni et al. |
| 2007/0271606 A1 | 11/2007 | Amann et al. |
| 2007/0288615 A1 | 12/2007 | Keohane et al. |

FOREIGN PATENT DOCUMENTS

| | | | |
|---|---|---|---|
| WO | 02058336 A2 | 7/2002 |

OTHER PUBLICATIONS

Rosen et al, "BGP/MPLS VPNs" Mar. 1999, Network Working Group Request for Comments, RFC 2547, pp. 1024.

Maughan et al, "Internet Security Association and Key Management Protocol (ISAKMP)", Nov. 1998, Network Working Group Request for Comments, RFC 2408, pp. 1-81.

Madson, C., "The Use of HMAC-MD5-96 within ESP and AH", Nov. 1998, Network Working Group Request for Comments, RFC 2403, pp. 1-7.

European Search Report dated May 20, 2010, 6 pages.

Bernard Aboba, Virtual Access Points, IEEE P802.11 Wireless LANs, May 22, 2003, Mircrosoft, and pp. 1-13.

Security Task Group of IEEE 802.1, Draft Standard for Local and Metropolitan Area Networks: Media Access Control (MAC) Security), IEEE P802.1AE/D5.1 (Jan. 19, 2006), pp. 1-150.

IEEE Computer Society, "IEEE Standards for Local and Metropolitan Area Networks: Virtual Bridged Local Networks," IEEE std 802.1Q 2003 Edition (May 7, 2003), pp. 1-312.

Butler, et al., A national-scale authentication infrastructure, Computer, vol. 33, Issue 12, Dec. 2000 pp. 60-66.

Garg et al., Scheduling algorithms for bounded delay service in virtual networks, Global Telecommunications Conference, 1999. GLOBECOM '99, vol. 2, 1999, pp. 1318-1322.

Redlich et al., Virtual networks in the Internet, Open Architectures and Network Programming Proceedings, 1999. OPENARCH '99. 1999 IEEE Second Conference on Mar. 26-27, 1999, pp. 108-114.

Venkateswaran et al, Virtual private networks, Potentials, IEEE, vol. 20, Issue 1, Feb.-Mar. 2001, pp. 11-15.

* cited by examiner

PUBLIC ACCESS POINT

This application is a Continuation-in-Part of U.S. patent application Ser. No. 10/057,566, filed Jan. 25, 2002, which is now U.S. Pat. No. 7,188,364, which is incorporated herein in its entirety by this reference thereto.

BACKGROUND OF THE INVENTION

1. Technical Field

The invention relates to wireless public access to electronic networks. More particularly, the invention relates to an architecture that permits the creation of virtual basic service sets from within a physical access point for an electronic network.

2. Description of the Prior Art

Public WiFi hotspots are deployed using traditional IEEE Std. 802.11-compliant access points with some exceptions. However, the IEEE Std. 802.11 architecture and security model are unsuitable for public use. Stations associated with an access point (AP) share an 802.11 Basic Service Set (BSS), or wireless LAN. Unless all members of a BSS are trustworthy, no station in the BSS is safe from attacks initiated by other members. Such attacks include stealing the basic service and any confidential information provided by subscribers to get the service, such as passwords and credit card information. Other attacks include disruptions in network integrity and quality of service. It is unrealistic to expect all members of a public BSS, i.e. one that is comprised of stations associated with a public AP, to be trustworthy. Therefore, stations are vulnerable in a public BSS.

Sharing a public BSS presents another threat. Members of the BSS can contaminate other member stations with worms or Trojan horses. The port-based DCOM RPC attack, MSBlaster, and Welchia worms are good examples. The threat is more acute with a public BSS which is an electronic cesspool. How can a station cope with the threats?

Stations in the BSS might fend for themselves with defenses such as personal firewalls. Alternatively, a public WiFi provider might deploy a security model that protects subscribers from one another. One approach is to prevent inter-station communication. This is an untenable solution though. Stations that trust each other should be allowed to communicate among themselves, even in a public setting. Stations, for instance, should be able to access a file server on the same local LAN in a meeting held at a convention center. This is the usual practice at standards meetings, for example. Yet if this type of sharing is permitted, then under IEEE Std. 802.11, it becomes easy for an intruder to render the entire BSS inoperable. This was demonstrated at the 2001 Usenix Security Conference and at the 2001 DEFCON conference in Las Vegas. No security model today for wireless LAN can support this type of sharing without introducing vulnerabilities.

It would be advantageous to provide a security model for wireless LAN that can support sharing of a single physical BSS without introducing vulnerabilities or compromising security among stations using the BSS.

SUMMARY OF THE INVENTION

The invention provides a security model for wireless LANs that can support sharing of a single physical BSS by stations without introducing vulnerabilities or compromising station security. Thus, a new kind of access point is provided, which is referred to herein as a Public Access Point (PAP). The PAP has a different security architecture than that prescribed by IEEE Std. 802.11. The PAP architecture permits the creation of virtual Basic Service Sets from within a single physical AP. An arbitrary number of virtual service sets can be created, and any number of end stations can belong to a virtual BSS. A PAP appears to end stations as multiple physical 802.11 access points, one for each virtual BSS. Therefore, a PAP is fully interoperable with any 802.11 end station.

As an example of a PAP's use, consider a convention center. Different meetings may use 802.11-enabled projectors. The PAP allows provisioning of separate LAN segments for each meeting, providing separate link privacy and integrity for each. Using only IEEE Std. 802.11 instead, a meeting projector and all stations capable of projecting with it must use a private access point or an ad hoc WLAN, and manage WLAN membership, authentication and keying material. Otherwise, anyone could project with the projector, or worse, intercept valid projector traffic before it is displayed so that it can be monitored or corrupted by an outsider.

Besides the security management burden associated with prior art approaches being too high, meeting planners prefer to leverage local access points rather than installing and configuring their own at every venue. The PAP can administer all security. With it, all end stations in each meeting, which includes the shared projector and any local file servers, are effectively associated with a virtual 802.11 access point for that meeting, and all virtual access points arise from the same physical PAP.

The invention also provides a location-update protocol for updating the forwarding tables of bridges that connect public access points together.

The invention further provides a method for more controlled bridging, which is referred to as fine bridging.

DETAILED DESCRIPTION OF THE INVENTION

Public Access Point

In U.S. patent application Ser. No. 10/057,566, a protocol is described whereby an end station can create a virtual bridged LAN (VLAN) that clones an existing VLAN by duplicating the existing VLAN's tagged and untagged member sets. Further, the new VLAN is unique by virtue of its unique security association. The association provides cryptographic keying material that keeps packets belonging to the VLAN private and permits their VLAN membership to be verified cryptographically by a keyed MAC. The new VLAN is owned by its creator. The owner controls which stations can join and discover the VLAN, as well as the VLAN's lifetime. Therefore, the VLAN is called a personal virtual bridged LAN (PVLAN).

One embodiment of the invention provides a refinement of the PVLAN that uses only standard elements of IEEE Std. 802.11-1999 (see Part 11: Wireless LAN Medium Access Control (MAC) and Physical Layer (PHY) specifications, ISO/IEC 8802-11:1999(E), ANSI/IEEE Std. 802.11, 1999 edition; and Part 11: Wireless LAN Medium Access Control (MAC) and Physical Layer (PHY) specifications, Medium Access Control (MAC) Security Enhancements, IEEE Std. 802.11i/D7.0, Draft amendment to ISO/IEC 8802-11:1999 (E), ANSI/IEEE Std. 802.11, 1999 edition).

Figure 1:
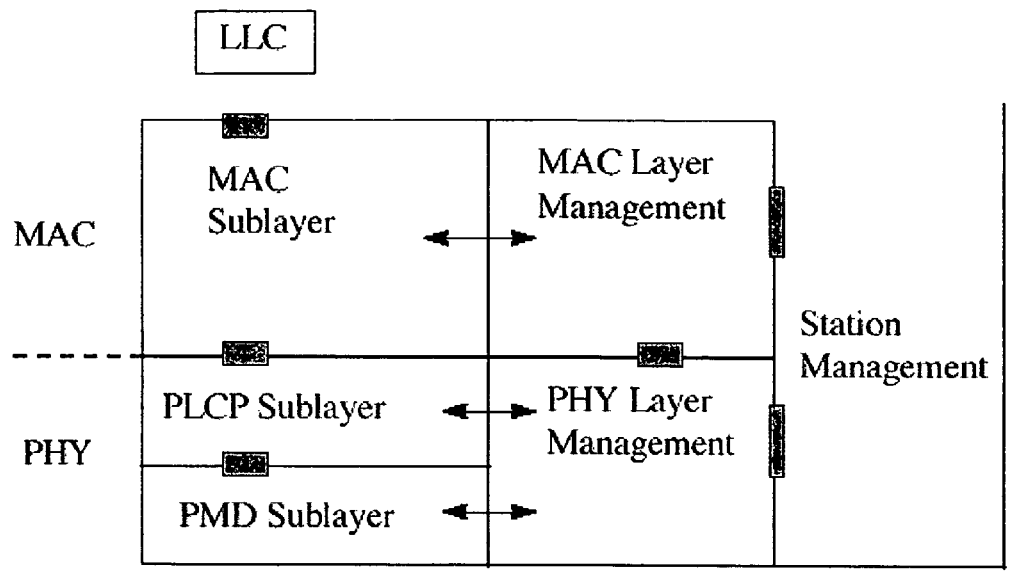
FIG. 1 is a block schematic diagram of an IEEE Std. 802.11 protocol entity.
Figure 2:
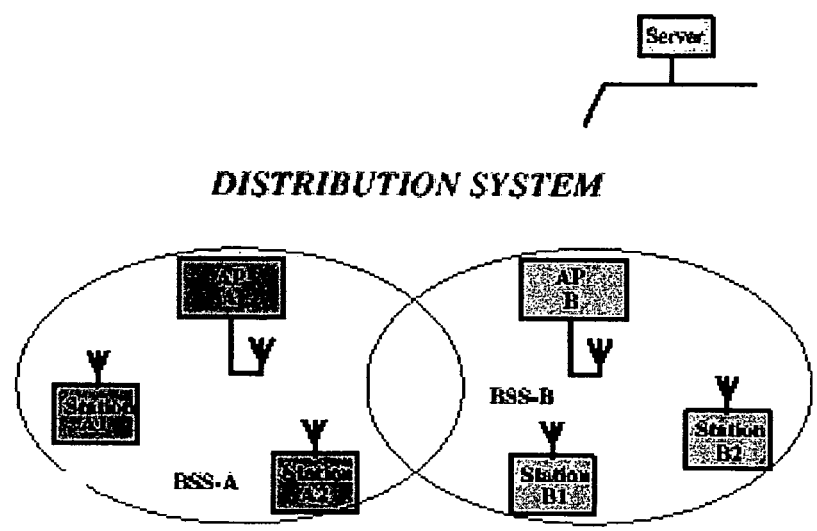
FIG. 2 is a block schematic diagram of an IEEE Std. 802.11 configuration infrastructure.

See also, FIG. 1, which is a block schematic diagram of an IEEE Std. 802.11 protocol entity; and FIG. 2, which is a block schematic diagram of an IEEE Std. 802.11 configuration infrastructure, in which each BSS (BSS-A, BSS-B) comprises respective access point (AP-A, AP-B) and associated stations (A1/A2, B1/B2). No modification of the behavior of any 802.11-compliant end station that does not act as an access point is required by the invention. The refinement instantiates a PVLAN to a virtual 802.11 BSS and affects only the access point.

Figure 3:
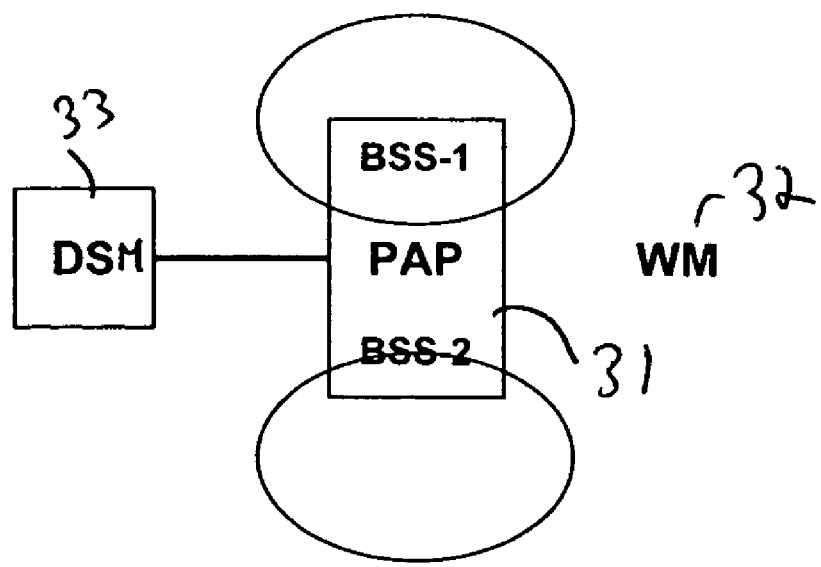
FIG. 3 is a block schematic diagram of a public access point architecture according to the invention.

FIG. 3 is a block schematic diagram of a public access point architecture according to the invention. A virtual 802.11 BSS, e.g. BSS-1 or BSS-2, comprises a set of stations, each with a hardware (MAC) address (see FIG. 1), that share a unique security association, called the group security association. A security association consists of an encryption key and an authentication code key.

Exactly one of the stations in a virtual BSS is a public access point (PAP) 31. It bridges the 802.11 Wireless Medium (WM) 32 and the 802.11 Distribution System Medium (DSM) 33.

A unique unicast security association exists for every station in a virtual BSS. It is shared between the station and the PAP of that virtual BSS.

Each virtual BSS, e.g. BSS-1 or BSS-2 has its own identifier, or BSSID. It is a virtual MAC address of the PAP belonging to that BSS. The PAP receives any frame from the WM destined for one of its virtual MAC addresses, and transmits a frame to the WM using one of its virtual MAC addresses as the source MAC address of the frame.

A collection of virtual basic service sets is supported by a shared TSF (Timing Synchronization Function), DCF (Distributed Coordination Function), and optionally a PCF (Point Coordination Function), at a single PAP. There is a single NAV (Network Allocation Vector) and PC (Point Coordinator) at each PAP. Such sharing is possible because the 802.11 virtual carrier-sense, medium reservation mechanism is designed to work with multiple basic service sets that use the same channel overlap. This sort of overlap may occur among virtual basic service sets supported by a single-channel PAP. The virtual service sets may use one channel and therefore may overlap at a PAP.

A PAP can belong to more than one virtual BSS. See BSS-1, BSS-2 on FIG. 1. Any station that is not a PAP can belong to at most one virtual BSS.

A virtual 802.11 BSS can be bridged with another virtual BSS through the connection of their public access points by a virtual bridged LAN. The PAP of each virtual BSS connects to the Distribution System (DS) via a trunked or untagged port of a VLAN-aware bridge. Frames transmitted to the DS may carry VLAN tags known to the DSM. A PAP may maintain a DSM VLAN mapping that maps a VLAN tag to a virtual BSSID.

There are presently two kinds of virtual BSS: Class-1 and Class-3 virtual BSS. A PAP supports exactly one Class-1 virtual BSS and one or more multiple Class-3 virtual basic service sets. The Class-1 virtual BSS is the only virtual BSS a station is allowed to occupy while it is in 802.11 State 1 or 2, as governed by the PAP. When in State 3, a station is allowed to join a Class-3 virtual BSS. The Class-3 virtual BSS may be determined by the kind of authentication, e.g. Open System or Shared Key, used to authenticate the station.

The Class-1 virtual BSSID is the BSSID field of every Class 1 and Class 2 frame that has such a field. It is also the receiver or transmitter address field, where appropriate, for Class 1 and Class 2 frames.

Every virtual BSS has identical beacon frame content except for the Timestamp, Beacon interval, Capability information Privacy (Protected) bit, Service Set Identifier (SSID), security capability element, and Traffic Indication Map (TIM) element fields.

A PAP does not have to beacon for a Class-3 virtual BSS if it does not support PS (Power-Save) mode for end stations in that BSS. If it does beacon for a Class-3 BSS, then the SSID element in every beacon specifies the broadcast SSID. These steps prevent any Class-3 virtual BSS from being identified through beaconing.

Only a Class-1 virtual BSS beacon has an SSID element with a non-broadcast SSID field. A station can associate with the Class-1 virtual BSS only. The station uses the non-broadcast SSID in the SSID element of an Association or Reassociation Request frame.

U.S. patent application Ser. No. 10/057,566 identifies PVLAN join and discovery steps. With a PVLAN represented as a virtual BSS, these steps are instantiated as follows:

Join

Every station is by default a member of the Class-1 virtual BSS at a PAP. The PAP can either authenticate the user of the station or the station itself in the Class-1 virtual BSS. If successful, the station enters 802.11 State 2 at that PAP. At this time, the PAP and station may exchange Class 1 and Class 2 frames while in the Class-1 virtual BSS.

Class 1 frames are not protected cryptographically. Class 2 frames may be protected cryptographically if the station and PAP share a unicast security association after successful authentication. The PAP and station may also share a group security association after authentication. The group security association is for that Class-3 virtual BSS to which the station belongs if it completes an 802.11 Association with the PAP.

Before the station and PAP can exchange Class 3 frames, the station must 1) request Association with the Class-1 virtual BSS from State 2; and
2) switch to a Class-3 virtual BSS.

The PAP switches the station to a Class-3 virtual BSS by responding to the station's Association Request with an Association Response MMPDU whose source address (Address 2 Field) or BSSID (Address 3 Field) is the Class-3 virtual BSSID for that virtual BSS. The Association Response's Capability information field may have its Privacy (Protected) bit set to one.

The Class-3 virtual BSS is determined in one of three ways:
1) an authentication server in the DS specifies a DSM VLAN for the user and the PAP maps it to a Class-3 virtual BSSID using its DSM VLAN mapping;
2) an authentication server in the DS specifies a Class-3 virtual BSS for the user; or 3) the PAP creates a new Class-3 virtual BSS for the user; the PAP may inform an authentication server of the new virtual BSS and provide it with rules for allowing other stations to join the new BSS.

Discovery

The Class-1 virtual BSS is discovered through 802.11 beacon or Probe Response management frames where the BSSID field (Address 3 field) and source address field (Address 2 field) are each set to the Class-1 virtual BSSID. The Privacy (Protected) bit of the Capability information field in these frames is set to zero. The TIM element of the beacon applies to the Class-1 virtual BSS. Only the Class-1 virtual BSS is advertised through beacon frames.

Data Frame (MPDU) Distribution

A PAP implements the MAC Protocol Data Unit (MPDU) bridge protocol. For an MPDU received from either the DSM or the WM, the protocol is defined by the following two cases:

1. MPDU received from the DSM. There are two subcases (Note: The two subcases handle delivery of the received MPDU to the local LLC of the PAP because the station of every PAP belongs to at least one virtual BSS):
    a. The received MPDU has no VLAN tag or a null VLAN tag. The MPDU from the DSM is relayed to a virtual BSS if the destination address is the address of a station that belongs to the virtual BSS and the station is associated with the PAP, or if the destination address is a group address, the virtual BSS has a station that belongs to the group and the station is associated with the PAP. All stations belong to the broadcast group.
    b. The received MPDU has a non-null VLAN tag. The virtual BSS to which the MPDU is relayed is identified by the virtual BSSID to which the non-null VLAN tag is mapped under the PAP's DSM VLAN mapping. If the mapping is undefined for the given tag, the MPDU is not relayed.

Any virtual BSS to which a received MPDU is relayed has a BSSID which forms the source address (Address 2 field) of the 802.11 MPDU that is relayed to that virtual BSS.

2. MPDU received from the WM. The received 802.11 MPDU is relayed to the virtual BSS identified by the Address 1 field of the MPDU if the destination address (Address 3 field of MPDU) is the address of a station that belongs to the identified virtual BSS and the station is associated with the PAP, or if the destination address is a group address. Otherwise, the frame is not relayed to any virtual BSS. The Address 1 field of the received 802.11 MPDU is the source address (Address 2 field) of the 802.11 MPDU that is relayed to the virtual BSS identified by the Address 1 field.

The received MPDU is also relayed to the DSM if the destination address (Address 3 field of MPDU) is the address of a station that is not associated with the PAP, or if the destination address is a group address. The MPDU relayed to the DSM has a VLAN tag if the DS is VLAN aware, and is untagged otherwise. The VLAN tag is the pre-image of the Address 1 field of the received MPDU under the PAP's DSM VLAN mapping.

Encryption and Decryption Process

Encryption and decryption applies 802.11 Data frames and Management frames of subtype Association Request/Response, Reassociation Request/Response, Disassociation and Deauthentication.

The encryption process used by a PAP before sending an 802.11 Data or Management frame to the WM involves two major steps:
    identifying a security association for the frame; and
    then using the association to construct an expanded frame for transmission according to some encipherment and authentication code protocols.

Different encipherment and authentication code protocols can be used for broadcast and multicast traffic among virtual basic service sets, and different encipherment and authentication code protocols can be used for directed (unicast) traffic among stations in a single virtual BSS.

If the frame destination address (Address 1 field) is the address of a station then the unicast security association shared between that station and the PAP is used in the expansion. If the frame is a Data frame and its destination address is a group address then the MPDU bridge protocol identifies a destination virtual BSS for the frame. The group security association for the identified virtual BSS is used in the expansion.

A non-PAP station transmits an 802.11 MPDU of type Data or Management to the DS using the unicast security association it shares with the PAP in its virtual BSS.

When receiving an 802.11 Data or Management frame from the WM, the PAP attempts to decipher and verify the integrity of the frame using the unicast security association for the station identified by the source address (Address 2 field) of the MPDU.

When receiving an 802.11 MPDU of type Data or Management from a PAP, a non-PAP station attempts to decipher and verify the integrity of the frame using the unicast security association it shares with the PAP if the destination address of the frame (Address 1 field) is the address of the station, and using the group security association of its Class-3 virtual BSS if the destination address of the frame is a group address.

Location-Update Protocol

The invention also comprises a location-update protocol for updating the forwarding tables of bridges, or other interconnection media, connecting Public Access Points together.

Given multiple Public Access Points attached to different bridges in a spanning tree of a bridged LAN and an end station that associates with one of them and then reassociates with a new PAP, the new PAP sends a directed Bridge Protocol Data Unit (BPDU) (called a relocation PDU) to the PAP with which the station was previously associated. The destination address of the BPDU is the Current AP address of the Reassociation Request frame, which is a Class-3 virtual BSSID. The source address is the hardware address of the station.

Upon receiving a relocation MPDU at a particular port, a bridge updates its forwarding table with an entry that binds the receiving port to the source address of the MPDU.

A receiving bridge forwards a relocation MPDU to its designated root port unless the MPDU arrived on that port or the receiving bridge is the root of the spanning tree. If it is received at the designated root port of a bridge or by the root bridge then it is forwarded according to the learned forwarding table of the bridge, which may involve flooding the MPDU to all ports except the receiving port.

Fine Bridging

One embodiment of the invention discussed above refines a PVLAN to a virtual BSS. Under the MPDU bridge protocol, any station in a virtual BSS can send a directed or group-addressed frame to any other station in that virtual BSS. This may be undesirable. A meeting in a conference center, for instance, may have its own virtual BSS but not all attendees trust each other. By sharing the same virtual BSS, some attendees can launch worms or viruses. Trying to thwart these attacks by assigning each attendee to a unique virtual BSS prevents attendees from being able to share a server. Ideally, the server is shared by all meeting participants, yet no participant should be able to access, i.e. send frames to, another participant. The Public Access Point described above cannot provide this level of access control. An AP supporting fine bridging can provide it.

Figure 7:
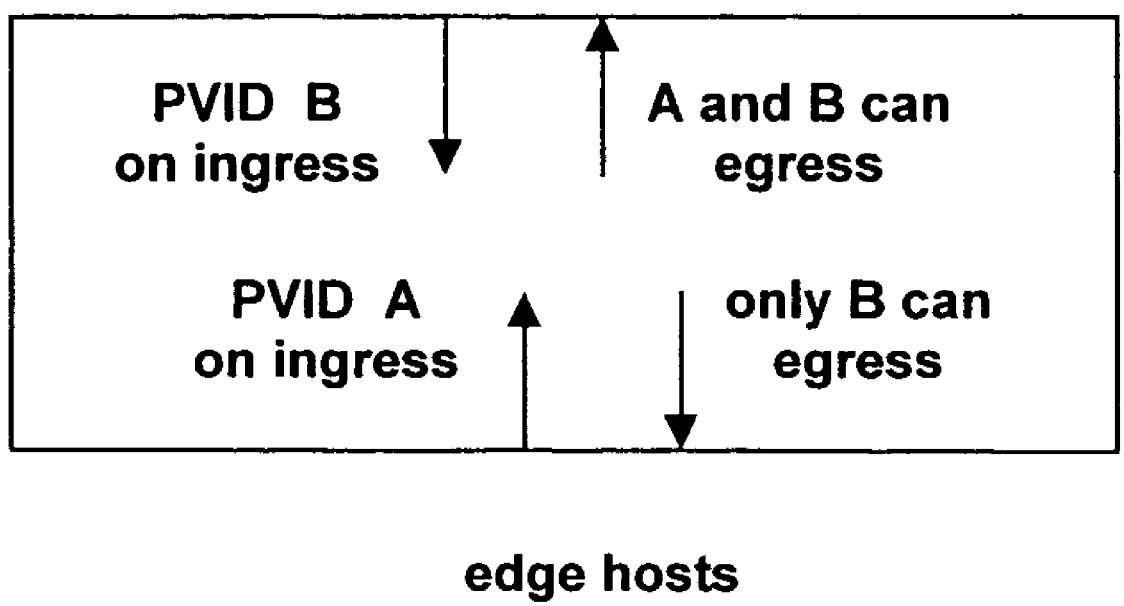
FIG. 7 is a block schematic diagram of an IEEE Std. 802.1Q bridge that eliminates direct communication between edge hosts connected to the infrastructure system via port-based VLAN assignment, egress filtering, and shared VLAN learning (SVL).

See also, FIG. 7, which is a block schematic diagram of an IEEE Std. 802.1Q bridge that connects a set of edge hosts to an infrastructure system such as a LAN. Untagged frames arriving from edge hosts are assigned to VLAN A by virtue of port-based VLAN assignment (PVID A) and untagged frames arriving from the infrastructure system are assigned to VLAN B (PVID B). The egress rules depicted allow for frames belonging to A or B to egress to the infrastructure while only those belonging to B are allowed to egress to the edge hosts. In this way, edge hosts are prevented from communicating directly with one another.

Fine bridging decouples identification of a broadcast or multicast domain with a BSS.

Under fine bridging, the bridging behavior of an AP is determined by a policy expressed as a directed graph. The nodes of the graph are stations and there is an edge from a station A to a station B if and only if station A must be able to access station B, in other words, station B must be able to receive directed or group frames from station A.

For a given policy, the broadcast domain for a node is itself and all nodes it must access. The broadcast domain set of the policy is the set of broadcast domains for its nodes.

In an implementation of a policy, there is a group security association per broadcast domain. Further, each station (node) possesses the group security association of the broadcast domain for itself in the policy, and of every other broadcast domain in the policy of which it is a member. The former association may be used by the station for sending group frames and the latter associations for receiving group frames.

The accessibility within a three-station virtual BSS, one of which is an AP, is captured by the policy shown in FIG. 2. Each node in the policy has {A, B, AP} as its broadcast domain. Thus, there is only one broadcast domain for the policy which is what one would expect given that the policy reflects a virtual BSS. Each station knows the group security association for the domain, and can send and receive group frames under that association.

FIG. 3 captures a policy among four stations where stations A and B share server stations S and D but A and B are not allowed to access each other.

The policy has broadcast domains B1: {A, S, D}, B2: {B, S, D} and B3: {D, A, S, B}. Station A knows the group security association for B1, to send group frames, and the group security association for B3 to receive group frames sent by S and D. Station D knows the group security association for B3, to send group frames and to receive them from S, and the group security associations for both B1 and B2 to receive group frames from A and B respectively.

Figure 4:
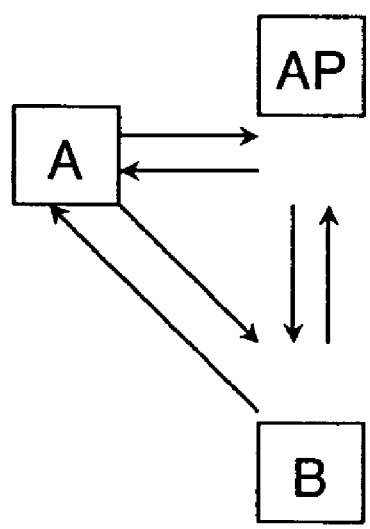
FIG. 4 is a block schematic diagram of a policy for accessibility within a three-station virtual BSS, one of which is an AP, according to the invention.
Figure 5:
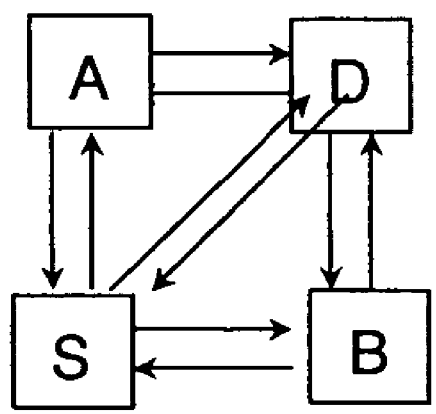
FIG. 5 is a block schematic diagram of a policy among four stations where stations A and B share server stations S and D but A and B are not allowed to access each other according to the invention.
Figure 6:
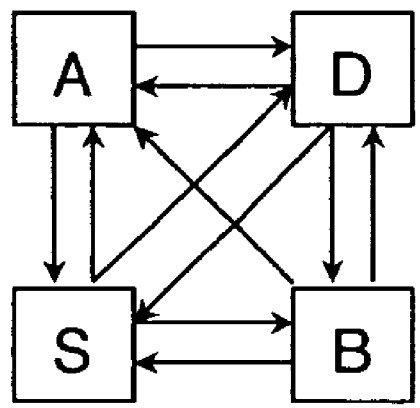
FIG. 6 is a block schematic diagram of the policy in FIG. 3, modified so that an edge from B to A is added to the policy according to the invention.

If the policy in FIG. 3 were modified so that an edge from, say B, to A were added to the policy, as illustrated in FIG. 4, then domain B2 would be eliminated and only B1 and B3 would remain.

If an edge from A to B were added to the policy in FIG. 4 then domains B1, B2 and B3 would collapse into the single domain B3 for the policy.

The provision of other policy variations are within the ability of those skilled in the art.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. An access point device for a wireless LAN for isolating an end station from a plurality of end stations to support segregation of network traffic between the end station and the plurality of end stations, the access point device serving as a common access point for communication in the wireless LAN, the access point device configured to:
   receive a request from said end station that is an association request or a probe request; and
   process said request by:
      determining for said request a basic service set (BSS) that is unknown to said access point device at the time of receipt of said request by said access point device;
      receiving at least one parameter defining said BSS;
      establishing said BSS based at least on said at least one parameter;
      establishing a security association with said end station within said BSS wherein the security association includes at least two keys, one key for encryption and another key for computing an authentication code; and
      sending a response to said end station that includes a BSSID of said established BSS.

2. The access point device of claim 1, further configured to provision a plurality of separate LAN segments while providing separate link privacy and integrity for each of said LAN segments.

3. The access point device of claim 1 wherein said at least one parameter is provided by said end station.

4. The access point device of claim 1 wherein said at least one parameter is provided by a source other than said end station.

5. The access point device of claim 1 wherein said request includes an SSID (service set identifier), wherein said at least one parameter is based on said SSID.

6. A method in an access point device for a secure wireless network to support segregation of network traffic among a plurality of stations, each of said stations having a hardware (MAC) address, comprising:
   receiving an association request or a probe request from a first station;
   determining for said request a basic service set (BSS) that is unknown to said access point device at the time said request was received by said access point device;
   receiving at least one parameter which defines said BSS;
   establishing said BSS based at least on said at least one parameter, thereby creating the Basic Service Set (BSS) for a subset of said stations;
   establishing a security association with each of said end stations within said BSS wherein the security association includes at least two keys, one key for encryption and another key for computing an authentication code; and
   sending a response to said end station that includes a BSSID of said established BSS,
   wherein stations in said subset belong to said established BSS and share a group security association.

7. The method of claim 6, further comprising the one or more cryptographic methods implemented in a secure relationship maintained by a MAC Security Key Agreement.

8. A method in an access point device for a secure wireless network to support segregation of network traffic among a plurality of stations, each of said stations having a hardware media access control (MAC) address, comprising:

receiving an association request or a probe request from a first station;

determining for said request a basic service set (BSS) that is unknown to said access point device at a time said request was received by said access point device;

receiving at least one parameter which defines said BSS;

establishing said BSS based at least on said at least one parameter, thereby creating said BSS for a subset of said stations; and sending a response to said end station that includes a BSSID of said established BSS;

wherein stations in said subset belong to said established BSS and share a group security association wherein said group security association is an implementation of a MAC security wherein said implementation of said MAC security comprises said implementation of a secure MAC service.

9. The method of claim 8, wherein said implementation of said secure MAC service comprises a MAC Security Key Agreement and a MAC Security Entity.

10. The method of claim 8, wherein said group security association comprises using one or more cryptographic methods.

11. The method of claim 10, further comprising the one or more cryptographic methods implemented in a security relationship maintained by a MAC Security Key Agreement.

12. An access point for segregating traffic among a plurality of end stations, comprising:
one or more storage units configurable to store:
a frame having a cryptographic authentication code; the frame having a source media access control (MAC) address to determine a preliminary VLAN classification when the frame carries a null virtual LAN ID;
the frame having a virtual LAN ID (VID) as the preliminary VLAN classification when the frame carries the VID;
a table of security associations providing a cryptographic authentication code key based on the preliminary VLAN classification wherein the cryptographic authentication code key is used to recompute a new cryptographic authentication code over a payload of the frame;
a processor configured to compare the new cryptographic authentication code with the cryptographic authentication code;
implement the preliminary VLAN classification as a final VLAN classification when the new cryptographic authentication code and the cryptographic authentication code match, wherein the frame is decrypted; and
not implement the preliminary VLAN classification as the final VLAN classification when the new cryptographic authentication code and the cryptographic authentication code do not match, wherein the frame is discarded; and discard the frame when said VLAN classification is not implemented.

13. The access point of claim 12, wherein the access point is configurable to perform an authentication operation that generates the authentication code key.

14. The access point of claim 12, wherein the new cryptographic authentication code is recomputed over the payload using a cryptographic message digest algorithm determined during an initial authentication operation.

15. The access point of claim 12, wherein the final VLAN classification is used as a value of a VLAN classification parameter of any corresponding data request primitives.

16. The access point of claim 12, wherein the cryptographic authentication code or the new cryptographic authentication code uniquely identifies the VLAN.

* * * * *